Jan. 26, 1960 P. S. VENEKLASEN ET AL 2,922,303
ACOUSTIC TESTING INSTRUMENT
Filed May 19, 1958 4 Sheets-Sheet 1

PAUL S. VENEKLASEN
FINN JORGENSEN
INVENTORS
BY
R. Hoffman ATTORNEY

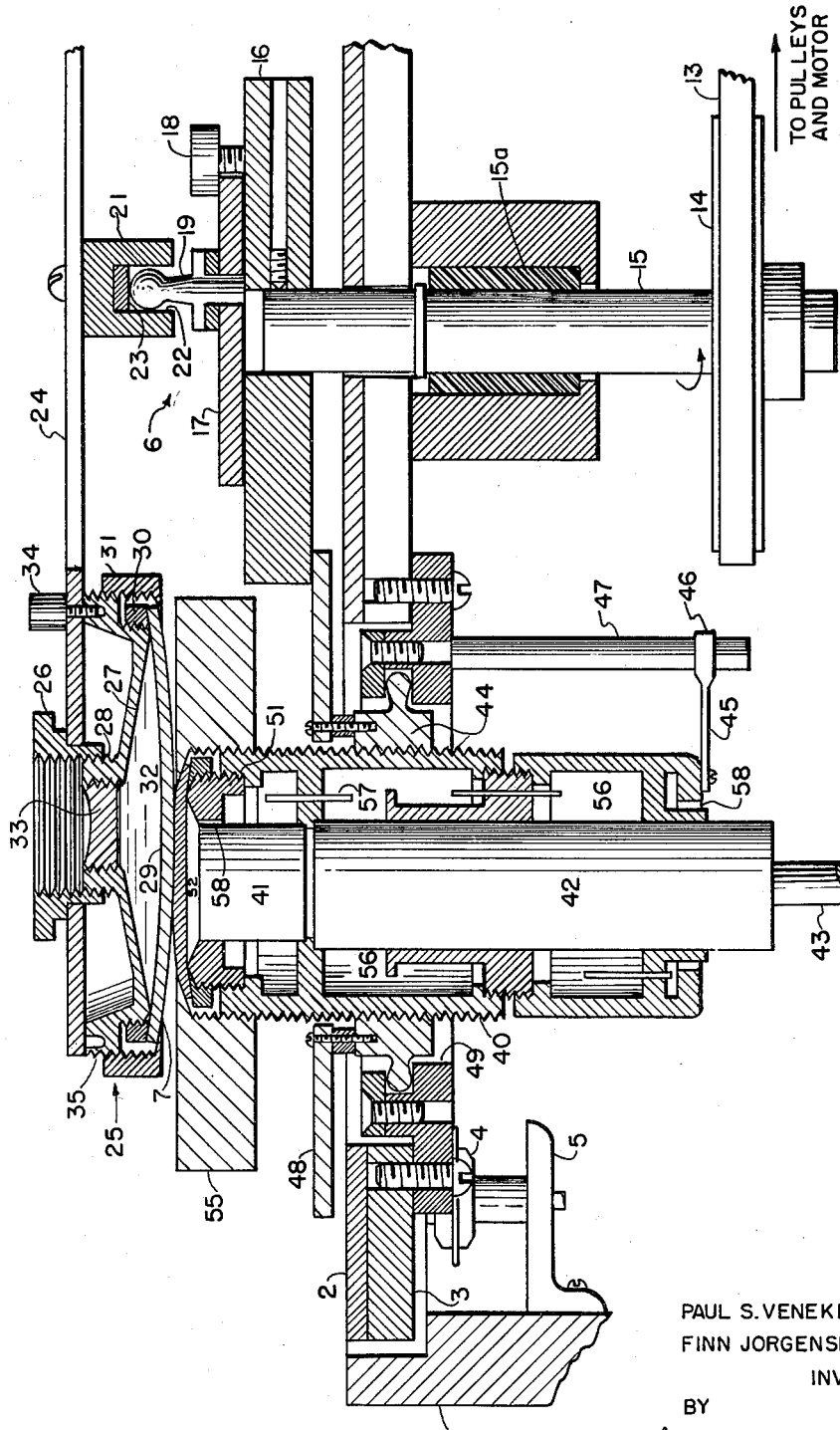

PAUL S. VENEKLASEN
FINN JORGENSEN
INVENTORS

United States Patent Office 2,922,303
Patented Jan. 26, 1960

2,922,303

ACOUSTIC TESTING INSTRUMENT

Paul S. Veneklasen, Los Angeles, and Finn Jorgensen, Santa Monica, Calif., assignors to the United States of America as represented by the Secretary of Agriculture Application May 19, 1958, Serial No. 736,660

4 Claims. (Cl. 73—159)

This invention relates to apparatus for measuring the characteristics of materials such as paper, leather, plastic films, laminated sheet materials, and particularly textile materials such as woven or knitted cloths, felts, fibers, yarns, etc. In particular, the invention is concerned with devices wherein measurement of the vibrations produced by rubbing samples of the material is utilized as an index of the character of the material, for example, the hand of textiles, or various properties which may affect the hand such as harshness or softness, fiber stiffness, resilience, compliance, flexural rigidity, and other factors.

In the preparation and processing of textile materials it is important to know the characteristics of the materials so that one can be sure they will serve their intended purposes. An important factor in many applications of textiles is the hand of the fabric. The hand, or handle as it is sometimes called, is dependent on a multitude of inter-related factors based on the characteristics of the fiber itself and the fabric construction. The fiber characteristics which affect the hand include fiber diameter, fiber diameter distribution, bending modulus, surface friction (harshness or softness), chemical composition, crimp, surface characteristics (scaly or smooth), etc. The fabric characteristics which affect the hand include surface smoothness or roughness, bending modulus, resilience, compliance, flexural rigidity, compressional modulus, hardness, weight, thickness, density, type of weave, etc. Commonly the hand of fabrics is estimated by feel while the sample is manipulated in the fingers. The hand of the material is usually rated in such qualitative terms as soft, silky, crisp, harsh, boardy, stiff, etc. Although the human hand is capable of detecting small differences in fabric or fiber quality, subjective factors are involved and it is impossible to set up universally accepted standards of fabric quality on this basis of tests by feeling. The device of the invention eliminates the human factor and provides a truly objective system for measuring textile quality. The device is readily calibrated and standardized making possible reproducible, standard measurement of the hand of fabrics.

Although the device of the invention is particularly useful for measuring the characteristics of textiles it is not restricted to such use but can be applied for testing the characteristics of diverse types of sheet material. Thus for example the device can be employed for testing the characteristics of leather, plastic films, laminated plastic sheets, etc. for suitability for intended use, for example in packaging, upholstery, curtain manufacture, shoe manufacture, and the like. Paper goods can similarly be tested, for example, the device can be employed to test tissues for suitability of application where the product comes into contact with human skin. Other applications of the device will be obvious to those skilled in the art from the foregoing illustrations.

In Thorsen Patent No. 2,752,781 there is disclosed a testing instrument wherein samples of cloth are rubbed together and the vibrations thereby created are picked up by a contact microphone. The signal from the microphone is measured, preferably with the aid of a harmonic wave analyzer, to provide an index of the characteristics of the cloth under test.

The device of this invention offers many improvements and advantages over the Thorsen instrument as explained below:

In the known device, the friction effect is attained by pulling one sample of cloth while two other stationary samples are pressed against the first. In this system, the length of time during which measurements can be taken is limited—when the moving sample is pulled out completely the test period is over. In the device of the invention there is no such time limitation; the friction effect is produced continuously for as long as desired. Consequently the measurement may be conducted without haste and may be repeated as often as desired.

A prime advantage of the device of the invention is that friction at the fabric interface is created by holding one fabric sample fixed and moving a superposed fabric sample in what may be described as non-rotary orbital movement. Thus the upper sample is moved through a circular path but without rotation about its own axis. This orbital motion provides these significant advantages:

(a) It permits continuous production of sound so that ample time is afforded for taking measurements. Also, the measurements can be repeated indefinitely.

(b) All elements at the fabric interface move at the same velocity whereby the sound produced is truly representative of the characteristics of all the fibrous elements. On the other hand, if rotational motion were used, different elements at the interface would be moving at different speeds. Elements near the center of rotation would be moving at such slow velocity that they would contribute little sound, and the total sound measurement would not properly represent the characteristics of these elements. In effect, the measurement would represent characteristics of only those elements distant from the center of rotation.

(c) The orbital motion makes the device capable of measuring the characteristics of masses of loose fibers, for example bulk wool. The measurement of such materials with the prior device was not practicable.

A basic principle of the present invention is that the vibration of fibrous elements during friction of the textile samples is converted to sound by impressing the vibrations through a diaphragm on a cavity. The variations in pressure (or sound) within the cavity are converted by a microphone into an electrical signal. This system is entirely distinct from that employed in the prior device wherein the vibrations of the fibrous elements were measured directly by use of a contact microphone. A primary advantage of the present system is that it is much more sensitive than the former system since in the present arrangement the conversion of vibration to pressure variations in the cavity involves an amplification, hence an increase in the electrical signal delivered by the microphone.

In the present device a desired pressure is exerted on the textile samples undergoing friction by the provision of a pressure head provided with a thin, flexible membrane backed by liquid. This yielding medium conforms to the surface of the textile so that there is an even distribution of pressure over the textile interface area. This means that all fibrous elements in the interface contribute to the same extent to the sound measurements. In the prior device pressure was provided by a non-yielding block of metal whereby pressure in the interface could not be uniform but would tend to be higher at local areas where the textile cross-section was thicker and lower where the textile was thinner in cross-section. A further advantage of the pressure head of the invention is that the liquid-backed membrane acts as a barrier preventing dissipation of energy from the friction area and preventing entry of outside noise into the friction area.

In the device of the invention novel means are provided to produce the orbital motion previously mentioned and to vary the velocity thereof. This means includes a pair of crank pins which drive an arm carrying the pressure head. By varying the degree of eccentricity of the pins, the velocity of rubbing contact may be varied. An especially advantageous feature of the arrangement is that the pins can be centered to stop the orbital motion. The intrinsic noise level of the instrument can then be measured with the drive mechanism operating yet without friction between the textile samples. Such measurement is, of course, useful in analyzing results taken with the machine in full operation to differentiate extraneous noise from the sound created by fabric friction.

Another feature of the invention involves provision of means whereby different characteristics of the samples under test may be measured. Such versatility is achieved through the use of different forms of the septum (or partition) dividing the lower sample of material from the cavity. This septum may be, for example, in the form of a relatively stiff, perforated sheet of metal. In such case the signal will largely represent the sound produced by interaction of fiber elements at the friction area. That is, the arrangement will provide mainly a measure of fiber characteristics as opposed to characteristics of the fabric. On the other hand, where the septum is in the form of a flexible, imperforate, thin sheet of material, or diaphragm, the signal will represent sounds created both by fiber interaction plus sounds created by vibration of the fabric itself. In this case the septum being flexible can vibrate in response to vibration of the lower fabric sample as well as to vibrations of fiber elements and convert these vibrations into pressure variations within the cavity. The net result of the use of such a septum is that the device provides a measure of both fiber and fabric characteristics.

Additionally, the device of the invention exhibits a very low noise level so that there is no interference with signal measurements. Such low noise level is attained through the use of vibration-isolating mounts, noiseless bearings, sound absorbing panels, etc. Also, an acoustic filter is provided to release static pressures from the cavity and prevent motor noises entering into the same.

The above and additional objects and advantages of the invention will be evident from the following description taken in connection with the annexed drawings wherein:

Fig. 2 is a side view of the front portion of the device, enlarged in scale and partly in cross-section.

Figure 1:
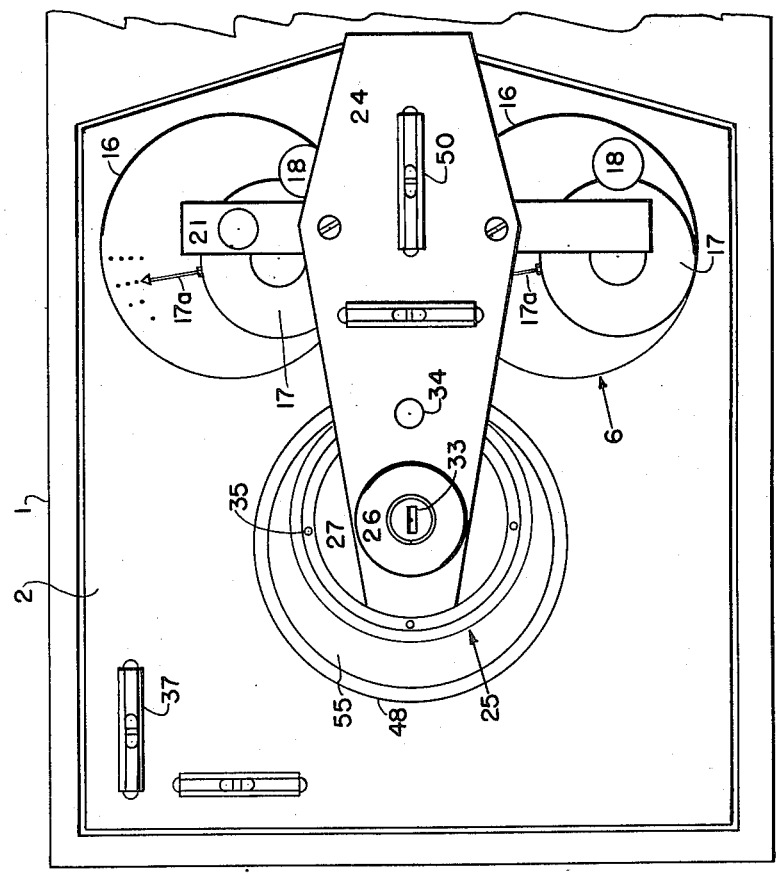
Fig. 1 is a plan view of the front portion of the device.
Figure 6:
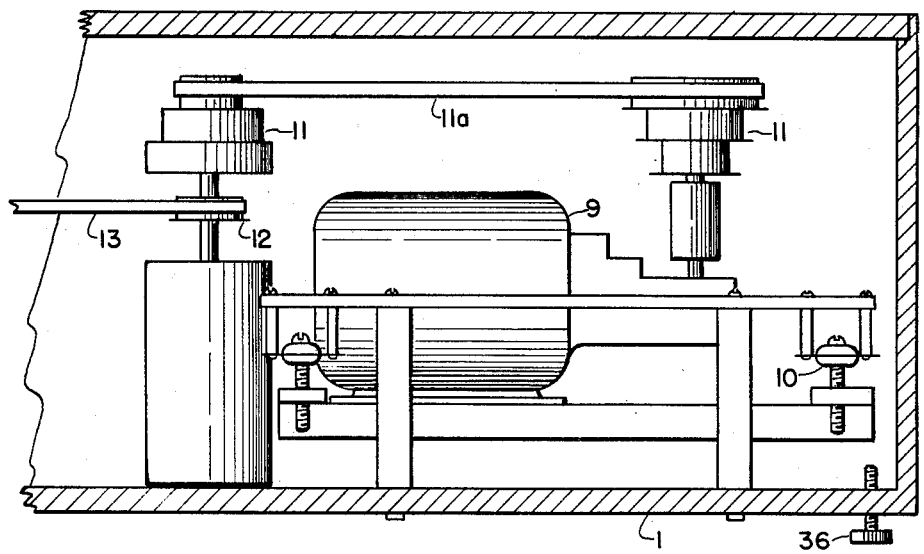
Fig. 6 is a side view of the rear portion of the device.

The operation and construction of the device illustrated in the annexed drawing are explained as follows:

Referring first to Figs. 1, 2, and 6, the device includes a box 1 within which part of the apparatus is contained, the remainder being mounted above the box 1 on platform 2. The interior of box 1 is preferably lined with acoustic tile or similar sound absorbing material (not illustrated) to absorb the sound of the motor, bearings, and other moving components. Platform 2 is provided with a heavy iron plate 3 matching it in size. This assembly is supported on several rubber mounts 4 carried by brackets 5 attached to the interior of box 1. By this means, the assembly of platform 2 and plate 3 and the components carried thereby are acoustically isolated from the box and the various components therein. Box 1 is provided with adjustable legs 36 (Fig. 6) and bubble levels 37 (Fig. 1) so that the entire device can be properly leveled.

The device includes a driving mechanism, generally designated as 6, which moves upper cloth sample 7 in an orbital, non-rotary path against lower cloth sample 8. A cavity and microphone assembly, positioned beneath sample 8, is provided to pick up the sound generated by the friction of the cloth surfaces and convert this sound into an electrical signal which can be measured by conventional means.

Figure 7:
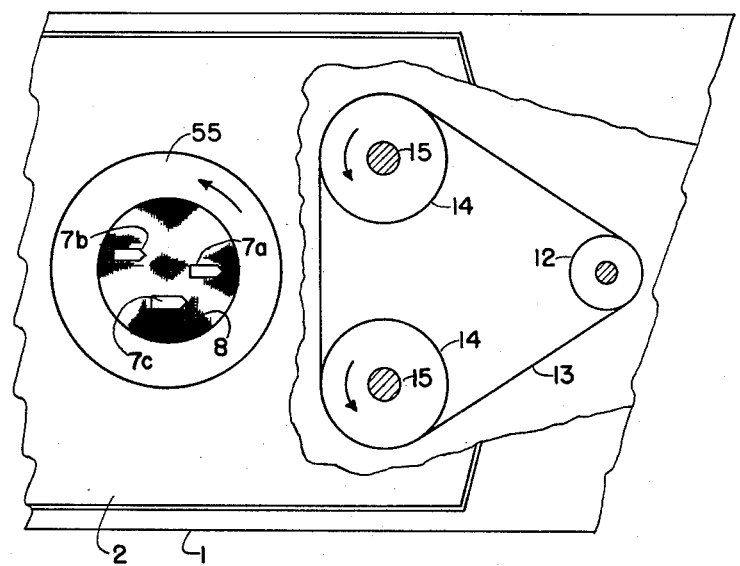
Fig. 7 is a fragmentary plan view provided to illustrate the orbital movement of the pressure head and a portion of the drive mechanism.

The driving mechanism for moving the upper cloth sample 7 in an orbital, non-rotary path is described as follows referring particularly to Figs. 1, 2, and 6: Within the rear of box 1 is provided a quiet-running synchronous, geared motor 9 (Fig. 6) suspended on vibration-isolating mounts 10. This motor through a pair of complementary stepped pulleys 11 and belt 11a rotates pulley 12. This latter pulley through belt 13 and pulleys 14 rotates shafts 15 in the same direction and at the same speed (Fig. 7). Preferably, belts 11a and 13 are of the corrugated or cog type and pulleys 11, 12 and 14 are toothed to engage the cogs in the belts. This arrangement assures constancy of speed. Also it produces less extraneous noise than conventional smooth pulleys and belts which are prone to produce noise by a stick-slip phenomenon. Also, bearings 15a within which shafts 15 are mounted are made of nylon, Teflon or other plastic material to ensure quiet operation. Similar bearings are employed for the other rotating shafts, i.e., those supporting pulleys 11 and 12.

Wheels 16, keyed on shafts 15, are each provided with a disc 17. Discs 17 are mounted eccentric to wheels 16 and may be pivoted thereon. Adjustment of the position of discs 17 is made by loosening screws 18 and rotating the discs 17 to the desired position then retightening the screws. Each of the discs 17 carries a pin 19. It is evident that if discs 17 are positioned so that pins 19 are at the centers of wheels 16, the pins will merely rotate about their own centers whereas if discs 17 are positioned so that pins 19 are at maximum distance from the centers of wheels 16, the pins will describe maximum circles of revolution. Arms 17a are provided to furnish a visual indication as to the degree of eccentricity of pins 19. Bar 21, provided with apertures 22 in which pins 19 fit, is driven by said pins in an orbital path. Pads 23 of nylon are placed in the seat of apertures 22 to minimize noise production. Arm 24 connected to bar 21 moves upper cloth sample 7 in an orbital path, the speed of orbital movement being determined by the position of discs 17. Through the mechanism explained above, centering of pins 19 results in no movement of sample 7 whereas as pins 19 are made more eccentric, sample 7 is caused to move at faster velocity in its orbital path. Generally, in using the instrument, sample 7 is moved over sample 8 at a linear velocity of about 50 to 320 mm. per minute. It is to be noted that the assembly of bar 21, arm 24 and pressure-head 25 is held in place only by gravity. For changing the cloth samples etc. the assembly is simply raised up so that pins 19 disengage from apertures 22.

Reference is now made to Fig. 7 which illustrates the manner in which upper cloth sample 7 is moved upon lower cloth sample 8. A section of upper cloth sample 7 at the beginning of its counterclockwise orbit is represented by 7a. (An odd-shaped piece of the upper cloth sample is depicted merely for clarity in this explanation.)

The position of sample 7 after it has completed a little less than half of its orbit is designated at 7b. Its position after three-quarters of the orbit has been completed is represented by 7c. It is evident from this diagram that each individual element in sample 7 circumscribes exactly the same path along lower sample 8. This means that all elements at the fabric interface move at the same velocity whereby the sound produced is truly representative of the characteristics of all the fibrous elements. The fact that sample 7 does not rotate in its orbit is clearly evident from the diagram in Fig. 7 because the pointed ends of areas 7a, 7b, 7c remain pointing in the same direction. Were there rotation, area 7b would point to the left instead of to the right, and area 7c would point downwardly instead of to the right. As noted hereinabove, if sample 7 would rotate, different elements at the interface would be subjected to different velocities (less at center, greater at periphery) with the result that the measurements would not represent the characteristics of all the fibrous elements.

Figure 3:
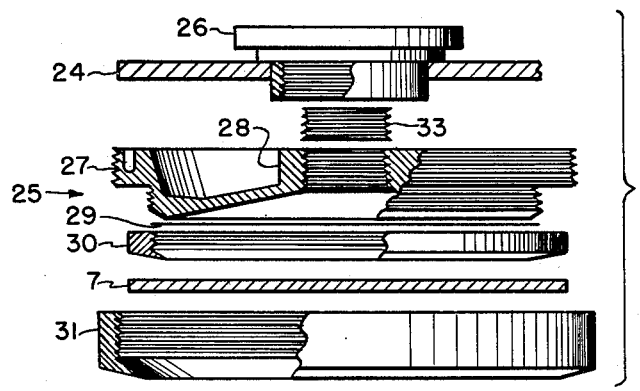
Fig. 3 is an exploded view of parts of the pressure head, enlarged in scale and partly in cross-section.

Referring now to Figs. 2 and 3, the pressure-head, generally designated as 25, for supporting upper cloth sample 7 is explained as follows: Within an aperture in arm 24 is provided an internally threaded bushing 26. An inverted-bowl member 27 is screwed by its middle threaded section 28 into bushing 26. Next a membrane 29 made of thin plastic sheet material or the like is placed on the lower face of member 27 and is secured in place by screwing on ring 30. A circular section of cloth 7 is placed against ring 30 and secured in place by screwing ring 31 onto the outer periphery of member 27. Now, glycerine, glycol, or other viscous damping fluid is introduced into chamber 32 and threaded plug 33 is screwed in place. Adjustment of plug 33 permits one to bow-out sample 7 to the desired degree of curvature.

Means is also provided for adjusting the position of cloth sample 7. To this end, screw 34 may be withdrawn, member 27 rotated to the desired position and screw 34 re-inserted into the desired one of holes 35 (Fig. 1) provided in the upper face of member 27. This adjustment is desirable as it permits rubbing samples 7 and 8 in desired paths relative to the grain of each. For example sample 7 may be adjusted so that its grain is parallel, perpendicular, or at a desired angle relative to the grain of sample 8.

The above-described arrangement of providing the upper cloth sample 7 with a liquid-packed membrane offers the advantages of providing a yielding medium so the pressure exerted by the weight of the pressure-head 25 is evenly distributed over the fabric interface. Moreover, the liquid-backed membrane acts as a barrier to prevent dissipation of energy from the friction area and to prevent entry of external noise into the friction area.

If desired, the pressure exerted by arm 24 and pressure-head 25 on the frictional interface may be augmented by placing weights on arm 24. For convenience the weights may be provided with threads and screwed into the interior of bushing 26.

Figure 4:
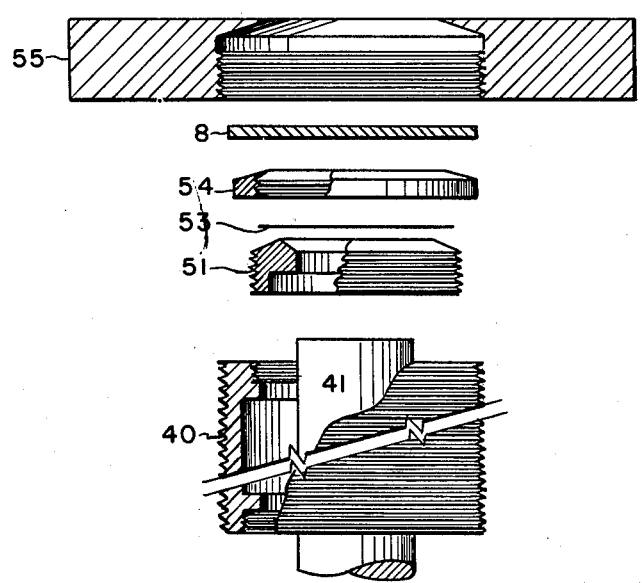
Fig. 4 is an exploded view of parts of the lower cloth specimen holding arrangement, cavity, and microphone, enlarged in scale and partly in section.

Referring to Figs. 2 and 4 the arrangement for holding the lower cloth sample and the sound pick-up components are explained as follows:

Within barrel 40 are provided microphone 41 and pre-amplifier 42. Cable 43 connects the pre-amplifier to a suitable equipment for measuring the electrical signal generated by the system. Barrel 40 is externally threaded and screwed into ring 44. After the barrel has been approximately positioned it is prevented from further rotation by attachment of arm 45 provided with yoke 46 which is slidable on rod 47. Then to raise or lower barrel 40 and associated components, wheel 48 is suitably rotated. Wheel 48 is connected to ring 44 and rotation of the wheel causes the ring to rotate. Since this ring 44 is prevented from moving up or down by abutments 49, the vertical movement is transferred to barrel 40. This adjustment is useful to properly level arm 24. Bubble levels 50 are provided on arm 24 for such adjustment.

Within the top of barrel 40 is screwed a cavity member 51 which when in place provides cavity 52 above microphone 41. A diaphragm 53 made of thin plastic sheet material or the like is placed over cavity 52 and clamped in place by screwing on ring 54. A circular cloth sample 8 is placed on the diaphragm and clamped in place by screwing on flanged disc 55.

The orbiting of sample 7 on sample 8 produces vibrations which are impressed through diaphragm 53 as sound pressure in cavity 52. Since static pressure in cavity 52 must be relieved to prevent damage to microphone 41 there is provided an acoustic filter. This comprises the chambers 56 in barrel 40 and the minute tubes 57 and ducts 58 connecting these chambers providing a path from cavity 52 to the external atmosphere. By this means static pressure can be bled out of cavity 52 without loss of sound and at the same time environmental sounds cannot pass into the cavity 52.

Diaphragm 53 is generally a sheet of thin plastic material such as cellophane, polyethylene, Mylar, etc. For example, 50-gauge Mylar has given excellent results. When the diaphragm is used, the device will supply a signal based on both fiber characteristics and fabric characteristics. That is, because of the vibration-responsive nature of the diaphragm it will impress on the cavity the vibrational energy derived both from vibrations of the fibers and vibrations of the lower cloth sample.

Figure 5:
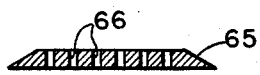
Fig. 5 is a cross-sectional side view of the perforated septum, enlarged in scale.

However, instead of a diaphragm one may employ as a septum a rigid perforated sheet of metal or plastic. Reference is made to Fig. 5 which illustrates such a perforated rigid disc comprising the circular body 65 and perforations 66. Where this form of septum is employed, the device is assembled and used exactly as described above but diaphragm 53 is replaced by perforated disc 65. As an example, a disc of aluminum about 0.11 inch thick and provided with a multiplicity of holes about 0.067 inch in diameter has proven very satisfactory. Where such a perforated disc is employed the signal will largely represent the characteristics of the fiber elements only. Thus in such case the sounds produced by interacting fiber elements pass through the perforations in the disc into the cavity where they are picked up by the microphone. However, because of the rigidity of the disc, it essentially prevents, or at least greatly damps, vibration of the fabric sample resting thereon with the result that the signal represents little, if any, energy derived from vibration of the fabric as a whole.

Ordinarily measurements are conducted by rubbing together two samples of the material under test as previously described. However, if desired, one sheet of material under test can be rubbed against a sheet of material presenting a standard surface. For example, a piece of cloth can be rubbed against emery cloth or sandpaper of selected grit content. Such measurements are conducted exactly as previously described with the exception that sample 7 is replaced by a sheet presenting the standard surface.

In employing the device to test bulk fibers, the fibers need but be loosely compacted into sheets which can be clamped by rings 30 and 55. In the alternative, one sample of the fibrous material may be clamped in place by ring 55 and the other sample of fibrous material attached to the pressure head by adhering it to membrane 29. For this purpose the membrane may be provided with a coating of a pressure-sensitive adhesive so that different samples may be adhered to the membrane by pressing and easily removed by peeling them off.

Figure 8:
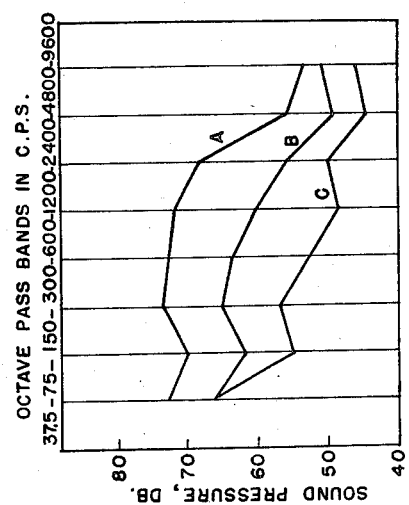
Fig. 8 illustrates curves of sound pressure-frequency spectra of several cloth samples.

The sound produced by rubbing of textile or other materials is composed of components of different amplitudes at different frequencies. It is thus advantageous to determine the spectrum of the sound produced. This can readily be done by connecting the output from the instrument (cable 43) with an electronic device adapted for measuring the amplitude of signals at different frequencies. Thus one can employ harmonic wave analyzers, band pass filters, or the like. Amplitude measurements may be made at single frequencies or at ranges of frequencies. For example, by the use of an octave pass band filter the amplitude of the signal may be measured at each of eight bands covering the audio frequency range of about 30–10,000 c.p.s. Typical spectra of three different cloth samples (A, B, and C) are shown in Fig. 8.

It is often desirable in employing the device of the invention to make a correction for leakage of sound from the friction area through the edges of the cloth. This correction can be determined by removing the assembly of pressure-head 25 and arm 24, laying top cloth sample 7 directly on lower sample 8, and placing a transducer over cloth sample 7. Currents of selected audio frequencies or frequency ranges are applied to the transducer to convert these currents to the corresponding sounds. The output from microphone 41 is measured and thereby the loss of energy through the edges of the cloth may be calculated. The losses at the different frequencies or frequency ranges may then be applied to the measurement to obtain the corrected spectra of the test samples.

Having thus described the invention, what is claimed is:

1. An apparatus for determining the characteristics of materials which comprises means for holding stationary a first sample of material, a pressure-head positioned over said first sample of material, said pressure-head including an inverted-bowl member filled with liquid, a flexible membrane across the face of said member, and means for clamping a second sample of material over the membrane, means for moving said pressure head in a non-rotating, orbital path with the second sample carried thereby in contact with the first sample, and means for converting the sound produced by frictional contact of the samples into an electrical signal.

2. The apparatus of claim 1 wherein the last-named means includes a cavity beneath the said first sample, a perforated septum between the cavity and the first sample, and a pressure-sensitive microphone in the base of the cavity.

3. The apparatus of claim 1 wherein the last-named means includes a cavity beneath the said first sample, a diaphragm between the cavity and the first sample, and a pressure-sensitive microphone in the base of the cavity.

4. An apparatus for determining the characteristics of materials which comprises a cavity, means for clamping a first sample of material over said cavity, a pressure-head including an inverted-bowl member filled with liquid, a flexible membrane clamped across the face of said member, and means for clamping a second sample of material over said membrane, means for moving said pressure-head with the second sample carried thereby in contact with the first sample whereby to generate vibrations which are impressed on said cavity as pressure variations therein, a pressure-responsive microphone at the base of the cavity for converting the pressure variations into an electrical signal, said means for moving the pressure-head including a pair of rotatable members provided with eccentrically adjustable drive pins, means for rotating said members, and an arm coacting with said drive pins and moved thereby in an orbital path, said arm carrying said pressure-head.

References Cited in the file of this patent

UNITED STATES PATENTS

| | | |
|---|---|---|
| 2,571,899 | Kroft et al. | Oct. 16, 1951 |
| 2,721,473 | Allen et al. | Oct. 25, 1955 |
| 2,752,781 | Thorsen | July 3, 1956 |
| 2,815,658 | Press | Dec. 10, 1957 |